US 8,135,880 B2

(12) United States Patent
Kolokowsky et al.

(10) Patent No.: US 8,135,880 B2
(45) Date of Patent: Mar. 13, 2012

(54) USB MASS STORAGE LOCKING

(75) Inventors: Steven Kolokowsky, San Diego, CA (US); Brian Tuttle, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 205 days.

(21) Appl. No.: 11/394,505

(22) Filed: Mar. 31, 2006

(65) Prior Publication Data
US 2008/0005409 A1 Jan. 3, 2008

(51) Int. Cl.
G06F 3/00 (2006.01)
G06F 5/00 (2006.01)

(52) U.S. Cl. .................. 710/36; 726/2; 726/26
(58) Field of Classification Search .......................... None
See application file for complete search history.

(56) References Cited

U.S. PATENT DOCUMENTS

| | | | |
|---|---|---|---|
| 5,949,882 A * | 9/1999 | Angelo ........................ 713/185 |
| 6,012,145 A * | 1/2000 | Mathers et al. ................. 726/17 |
| 6,038,320 A * | 3/2000 | Miller ............................. 380/44 |
| 6,040,792 A | 3/2000 | Watson et al. |
| 6,073,193 A | 6/2000 | Yap |
| 6,124,750 A | 9/2000 | Alleven et al. |
| 6,145,029 A * | 11/2000 | Deschepper et al. ........... 710/36 |
| 6,389,494 B1 | 5/2002 | Walton et al. |
| 6,418,534 B1 * | 7/2002 | Fogle ............................. 726/34 |
| 6,541,879 B1 | 4/2003 | Wright |
| 6,625,761 B1 | 9/2003 | Sartore et al. |
| 6,671,831 B1 | 12/2003 | Sartore et al. |
| 6,691,201 B1 | 2/2004 | Williams et al. |
| 6,754,725 B1 | 6/2004 | Wright et al. |
| 6,763,399 B2 * | 7/2004 | Margalit et al. ................. 710/13 |
| 6,813,669 B1 * | 11/2004 | Cato et al. ..................... 710/302 |
| 6,813,672 B1 | 11/2004 | Kamran et al. |
| 6,820,160 B1 | 11/2004 | Allman |
| 6,839,778 B1 | 1/2005 | Sartore et al. |
| 6,880,054 B2 * | 4/2005 | Cheng et al. .................. 711/164 |
| 7,069,370 B2 * | 6/2006 | Sukegawa et al. ............. 710/305 |
| 2002/0010827 A1 * | 1/2002 | Cheng ........................... 711/103 |
| 2004/0010656 A1 * | 1/2004 | Chiao et al. ................... 711/103 |
| 2004/0211835 A1 * | 10/2004 | Tournemille et al. ......... 235/441 |
| 2004/0243385 A1 * | 12/2004 | Rothman et al. ............... 703/24 |
| 2007/0083939 A1 * | 4/2007 | Fruhauf et al. ................. 726/34 |

* cited by examiner

Primary Examiner — Elias Mamo

(57) ABSTRACT

Disclosed is a mass-storage device, comprising a Universal Serial Bus (USB) interface, a locking function coupled to the USB interface wherein the locking function is accessible via a USB device class other than a mass-storage class, and a data mass-storage memory coupled to the locking circuit.

7 Claims, 5 Drawing Sheets

USB MASS STORAGE LOCKING

TECHNICAL FIELD

The present invention relates generally to electronic circuits, and in particular to circuits and devices for storing information.

BACKGROUND

The Universal Serial Bus (USB) standard was initially offered in the mid-1990's as an easy-to-use universal interface for a Personal Computer (PC). Since then, USB has gained widespread acceptance. From the user perspective, the benefits of USB include universal plug-and-play and relative ease-of-use. When a USB peripheral is plugged-in to a USB port on a PC, the system will auto-detect and auto-configure the device. In most cases, there is zero user intervention. This is a significant improvement over the prior technology where a user had to open the PC to install a component. The USB interface also eliminates the need for multiple I/O standards to peripheral devices, thereby simplifying PC connectivity for the consumer as well as simplifying manufacturing for the PC Original Equipment Manufacturers (OEMs).

The USB devices/peripherals may include devices such as printers, scanners, keyboards, a mouse, joysticks, digital cameras, digital video cameras, data acquisition devices, modems, speakers, telephones or video phones, storage devices such as ZIP drives, or any other peripheral or computing device.

The original USB specification has evolved over time to meet the needs of industry, resulting in two versions available today. The USB interface is described as version 1.1 "Universal Serial Bus Revision 1.1 specification" and version 2.0 "Universal Serial Bus Revision 2.0 specification,". Both documents are available at the USB website http:Hlwww.usb.org/developers/docs/

Both the USB 1.1 and USB 2.0 interfaces are wired interfaces, as they use a cable between the host (for example a personal computer or PC) and the USB peripheral. The first version of the USB, USB 1.1, focused on making computing easy for everyone, and it has been very successful in achieving this goal. However, the bandwidth of USB 1.1 is insufficient for some applications. With a top speed of 12 million bits/second (Mb/s), the system performance could occasionally become sluggish if multiple multimedia devices were attached to one USB port.

To address this problem the USB specification was updated to version 2.0 to improve the performance and usability of PC peripherals, opening the door to a world of high-performance/high-bandwidth applications such as mass storage, digital video, and broadband access. A further advantage is that all of these applications and many others can run simultaneously. The speed of USB 2.0 has been increased to 480 mbps, a 40× improvement over its predecessor. The USB 2.0 protocol, however, maintains backwards compatibility to the full speed (12 Mb/s) and low speed (1.5 Mb/s) devices defined in the USB 1.1 specification. Mass storage is a protocol within the USB standard used to attach storage devices to a computer, such as hard disk drives, floppy disk drives, small portable nonvolatile memory "thumb" drives, DVDs, CD-ROMs, and other devices for storing large (more than several megabytes) of data.

A first conventional locked mass storage solution is to enumerate a mass storage device (or a portion of the device) as a removable media device (like a CD-ROM). This first conventional solution is shown in FIG. 1. FIG. 1 shows a system 100 where a personal computer (PC) 110 is running an operating system 120. A mass storage device/peripheral 130 is coupled to the PC via a USB interface. The mass storage device/peripheral 130 comprises locking circuitry 140 (in one embodiment unlocked by a password) and a hard disk drive 150. The personal computer 110 may be in laptop or desktop form, and may be an IBM-compatible computer or a Macintosh compatible computer or other form of computer. In the conventional system 100 the hard disk is represented by the operating system 120 to the PC 110 as a 'floppy disk' removable storage drive.

In the system 100 of FIG. 1, the storage device 130 is in a locked status. When an incorrect password 160 is presented to the locking circuitry 140, the locking circuitry represents 170 to the operating system (OS) 120 that it is an empty drive, i.e. that drive 150 has no disk in it. An advantage of this first conventional solution is that it works well with existing operating system 120 error reporting protocols.

A disadvantage of this is that it limits the usage of the storage device 130. For example, Microsoft Windows™ will not allow a user to create multiple partitions on a removable device. For large mass storage devices (such as hard drives) it is desirable for a user to create separate partitions on the drive, for example to more efficiently use space or to better organize media etc.

FIG. 2 shows a conventional system 200 similar to the conventional system 100, but in system 200 when a correct password 260 is presented to the locking circuitry 240 of mass storage device 230, the locking circuitry 'opens' and appears 270 to the operating system 220 that media is present in the drive 250, and the data on this drive is made accessible to the operating system 220 and to PC 210.

Another conventional solution implements security within the PC driver. Any input/output (i/o) requests made to the driver are pended (paused) until the device is unlocked. In this case, the unlock request does not pass through the standard queue, but goes directly to the device. At the user level, the effect is that the drive letter does not show up until the drive is unlocked.

Yet another conventional solution is to create a custom mass-storage driver to filter access to the device. Microsoft will not easily certify a custom driver that takes over the function of a class driver. Also, this solution requires a new driver for every operating system (OS) and every operating system presents new issues to resolve. For example, the Apple Macintosh (Mac) operating system requires that the custom driver provide the entire ATA stack, not just a USB interface.

A further conventional solution is to wait until the drive is unlocked before allowing commands passed to the drive to succeed. The problem with this approach is that the command queue to the device may fill up with unfulfilled requests, which will block the unlock command.

It would be desirable to have a solution that allows easy connection of a mass storage device to a computer without need for custom drivers, and with the limitations of the conventional 'floppy drive' removable media protocol on conventional operating systems.

DETAILED DESCRIPTION

An embodiment of improved USB mass storage locking via a secondary interface is described. In the improved solution a lockable removable storage device can be enumerated as something other than a mass storage device, using an alternate interface to the mass storage locking device to control the security function. The alternate interface is used to access the drive while it is locked. This allows access to the custom features of the device without going through the mass-storage driver. The user can be prevented from seeing the locked portion of the drive until it is unlocked. When the drive is unlocked, it can reNumerate as a new device that exposes the unlocked drive with or without the security interface. The term reNumerate describes a virtual unplug and plug operation of a USB device connected to a host. The USB device acts as if it has been physically unplugged and then plugged back into the host.

Each of the following described solutions are 'alternate interfaces' that can be used instead of the regular USB mass storage device class for an unlock function. In a first improved solution a mass storage device is enumerated as a human interface device (HD) class under the universal serial bus (USB) standard. The human interface device enumeration is generally used for keyboards, mice, joysticks, gamepads and other devices humans can use to provide an interaction to a computer. A method for performing the first improved solution is described in FIG. 3.

A second improved solution is to use a vendor-specific interface that is not covered by the USB standard. The second vendor-specific solution may be more secure than a USB standard solution as it is not an 'open' solution, i.e. the detailed operation of the solution may be kept proprietary by the vendor. This vendor-specific solution may need custom work by the vendor to develop, which costs money and may require significant time to write.

A third improved solution is to use a device firmware upgrade class. This is a class defined in the USB standard for use when upgrading firmware (software instructions and code) located in a peripheral device.

A fourth improved solution involves using the USB audio protocol, where the mass storage device would be enumerated as an audio device and data passed to and from it in this manner.

A fifth improved solution involves using the USB communications protocol, where the mass storage device would be enumerated using a communications channel and data passed to and from it in this manner.

A sixth improved solution involves using the USB imaging protocol, which is generally used for connecting scanners, digital camera or other imaging devices to a computer through the USB bus.

Figure 1:
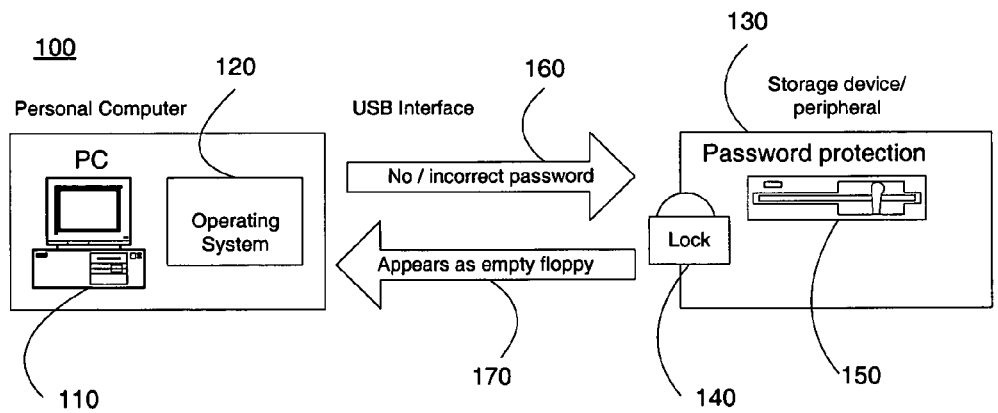
FIG. 1 illustrates a conventional locked removable media solution appearing as an empty floppy drive.
Figure 2:
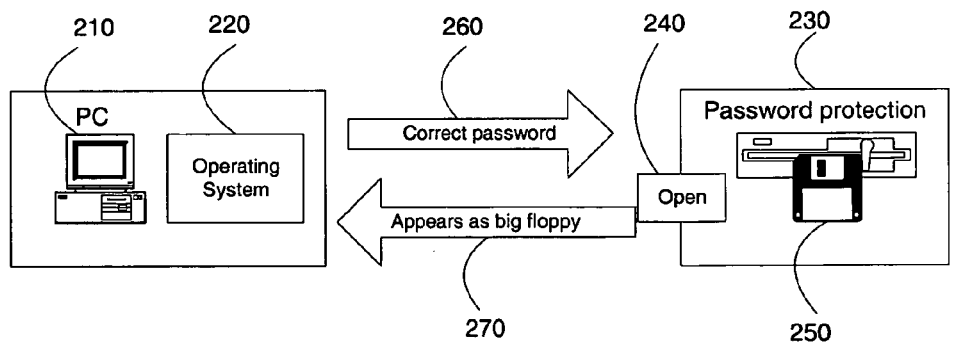
FIG. 2 illustrates a conventional unlocked removable media solution appearing as a floppy drive with media present.
Figure 3:
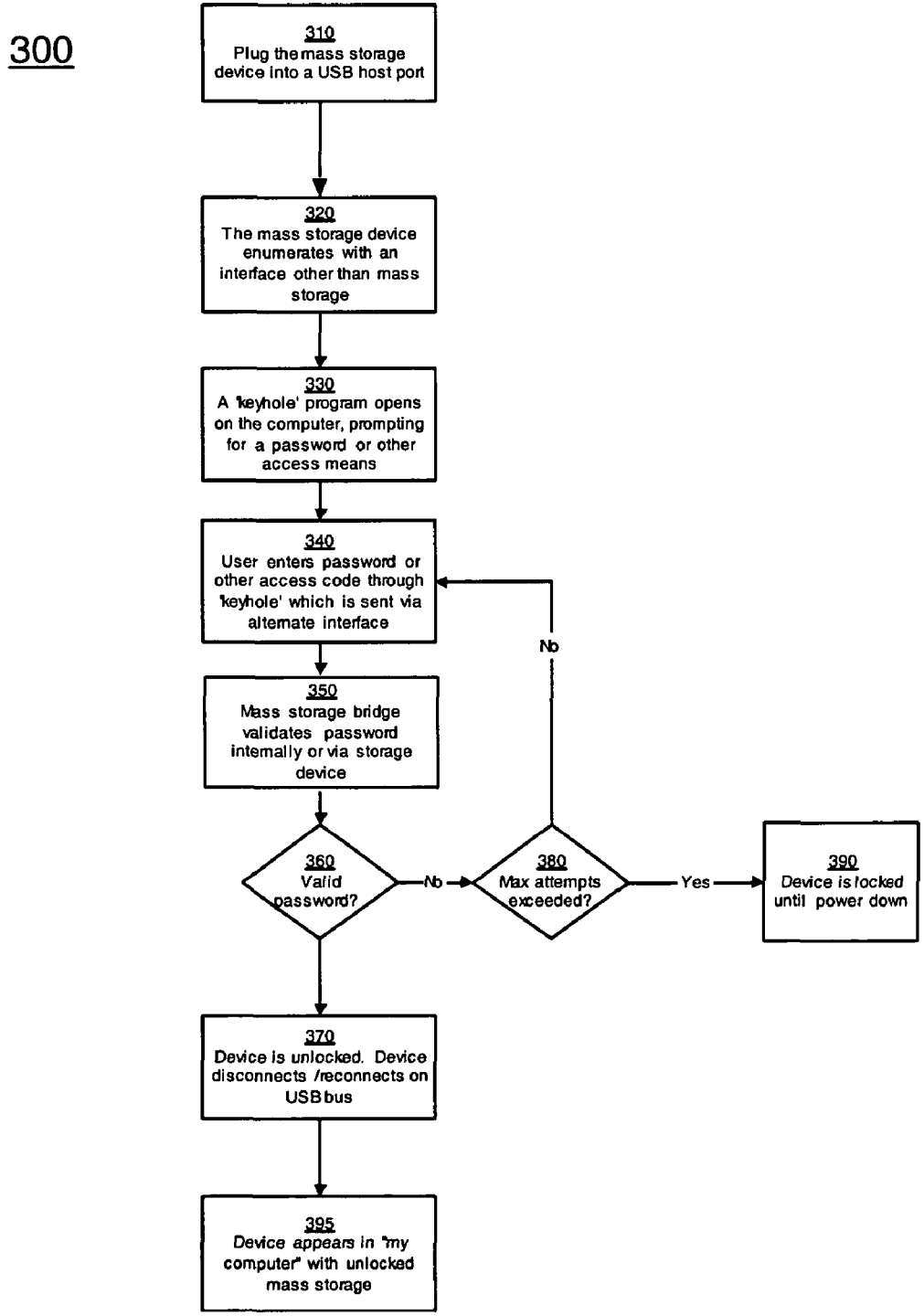
FIG. 3 illustrates a flowchart showing operation of an improved mass-storage locking solution using a secondary interface.

A flowchart showing operation of an embodiment 300 of the first improved solution is shown in FIG. 3. All of the other improved solutions may operate using a similar flowchart to that of FIG. 3, using the appropriate class instructions and protocol to communicate with the USB interface.

In embodiment 300, in a first step 310 a lockable mass storage device is connected to (in one embodiment via a USB alternative (i.e. non-mass storage) interface class) a computer. In a second step 320 the mass storage device enumerates via the alternative interface class as a device other than a mass-storage device. This device may or may not include a mass-storage interface. In a third step 330 a 'keyhole' program opens up on the computer, prompting for a user to provide a password or other access means. The other access means may include a biometric 'key' such as a fingerprint or iris scan or voice input, or a physical electronic 'key' such as a passcard, employee badge with radio frequency identifier (RFID) tag, or other electronic identifier that a user inserts or places near to (for wireless communication) the computer. The keyhole program may be stored on the computer, or on the lockable mass storage device, or be downloaded from a network or another source. In a fourth step 340, a password or other access means is provided through the 'keyhole', and this password is sent via the alternative interface to the mass storage device. In a fifth step 350, the mass storage device checks if the password or other access means is valid. The password may be validated within the USB controller or within additional circuitry inside a hard disk drive (HDD), nonvolatile semiconductor memory device, or other storage device e.g. a compact disk (CD) reader or digital video disk (DVD) reader, or other optical storage medium.

In a sixth step 360, the password is validated. If the password or other access means is validated, the mass storage device ReNumerates in step 370 and appears as a regular hard drive through the operating system on the computer in step 395. This ReNumeration operation allows a mass storage hard drive to act as a regular hard drive so it is not subject to the limitations imposed on removable storage devices (e.g. floppy drives, which the Windows operating system restricts to one partition). The hard drive can be partitioned as desired by the user. If the mass storage device is an optical drive, then the drive contents may be accessed or locked as desired by the user.

If the password is incorrect, the USB bridge checks in step 380 to see if the maximum number of password attempts has been reached. If not, it returns to step 340 and prompts the user again. If the maximum number of attempts has been reached, the USB bridge takes another action which could include erasing all data on the device, displaying a mock device with different data, or remaining unresponsive.

In one embodiment of the improved solution, different actions could be taken by the computer or by the mass storage device itself based upon a number of attempts to access the mass storage device. In one embodiment if a certain number of failed attempts are made, the drive may display a 'mock' device (for example an almost empty drive), or factory 'mock' data, or user selected 'mock' data. In another embodiment, a user may create multiple partitions on a drive with each partition accessed by a different password. The drive may also be set up in this with multiple partitions at time of manufacture. In another embodiment, after a higher number of failed attempts, the drive may assume that it is stolen and being 'hacked' and may encrypt or even erase the data on the drive.

Figure 4:
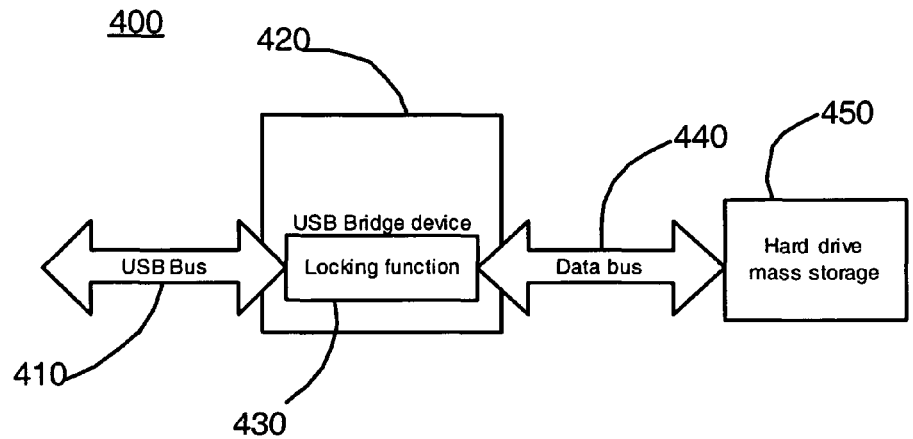
FIG. 4 illustrates a USB bridge implementing a locking function, coupled to a hard disk drive mass storage device.

FIG. 4 illustrates a system 400 comprising a USB bridge device 420 implementing a locking function 430. The USB bridge device 420 is coupled through a data bus 440 to a hard drive mass storage device 450. In one embodiment the data bus 440 may be an ATA bus, or a SATA (serial ATA) bus, or an ATAPI bus, or a SCSI bus. The bridge device 420 is coupled to a USB bus 410, and through this bus coupled to a computer or other host device.

Figure 5:
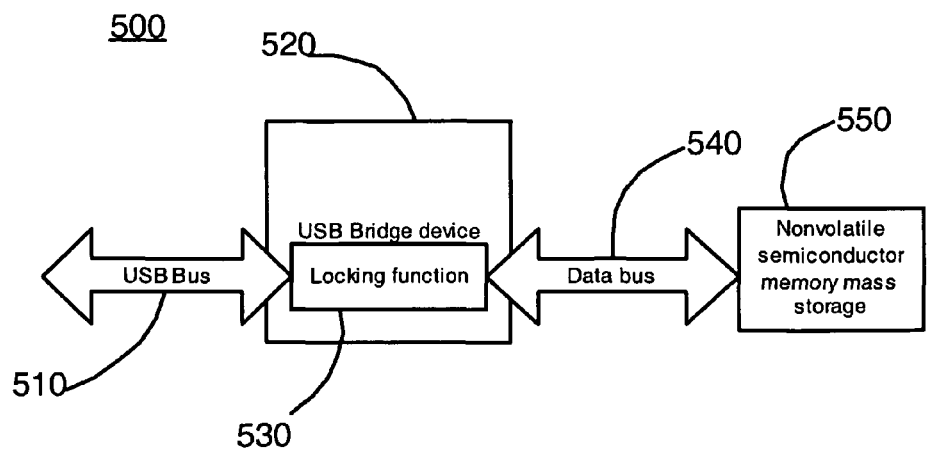
FIG. 5 illustrates a USB bridge implementing a locking function, coupled to a nonvolatile semiconductor mass storage device.

FIG. 5 illustrates a system 500 comprising a USB bridge device 520 implementing a locking function 530. The USB bridge device 520 is coupled through an interface 540 to a nonvolatile semiconductor memory mass storage device 550. In one embodiment the interface 540 may be a secure digital (SD) interface, a compact Flash interface, an xD interface, a multimedia card (MMC) interface, a SmartMedia interface, a Sony Memory Stick™ interface, or any other interface to a memory device such as a direct connection to a NAND Flash memory chip. The bridge device 520 is coupled to a USB bus 510, and through this bus coupled to a computer or other host device.

Figure 6:
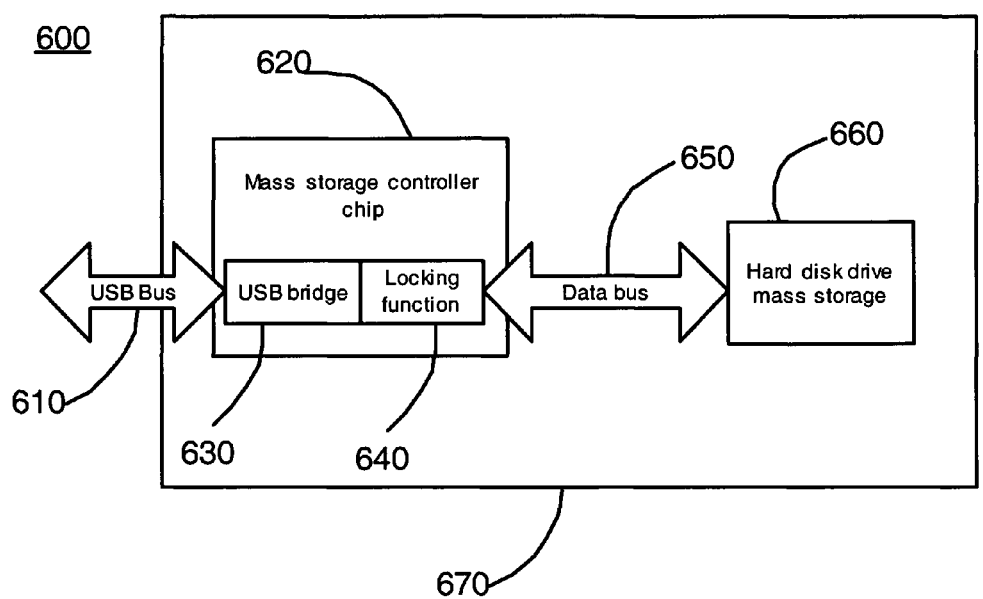
FIG. 6 illustrates a mass storage controller chip having implementing a locking function, coupled to a hard disk drive mass storage device.

FIG. 6 illustrates a system 600 comprising a mass storage device chassis 670, wherein the chassis comprises a USB bridge device 630 implementing a locking function 640. The USB bridge device 630 is coupled through an interface 650 to a hard disk drive mass storage device 660. In one embodiment the interface 650 may be an ATA bus, or a SATA bus, or an ATAPI bus, or a SCSI bus. The bridge device 630 is coupled to a USB bus 610, and through this bus coupled to a computer or other host device. In another embodiment, the hard disk drive mass storage device 660 may be replaced by an optical drive such as a DVD drive, CD drive, a high-definition optical storage device or other optical storage drive.

Figure 7:
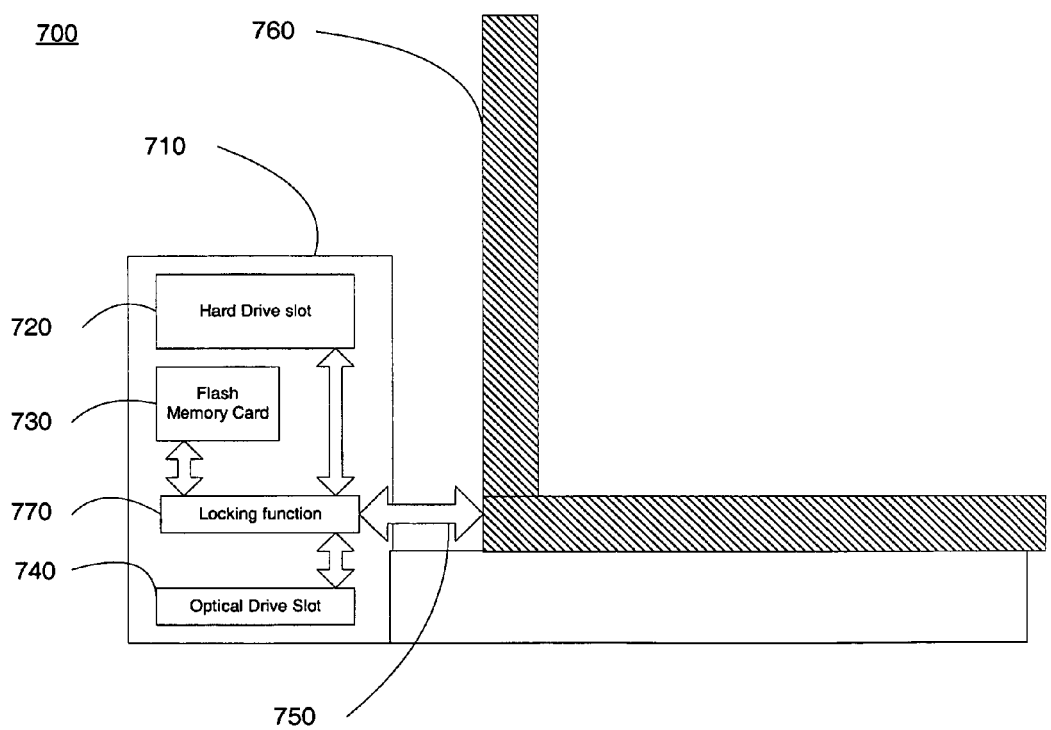
FIG. 7 illustrates a docking station for a computer or other multimedia device, having a slot for a mass storage device.

FIG. 7 illustrates a system 700 comprising a docking station chassis 710 for docking a laptop computer or other multimedia device 760, through an interface 750. The docking station may comprise one or more of a hard drive slot 720, a flash memory slot 730, and an optical drive slot 740. A locking function 770 may be coupled to the hard drive slot 720, to the flash memory slot 730, and/or to the optical drive slot 740. The locking function 770 may control access to the respective hard drive, flash memory and/or optical drive. The locking function 770 may operate according to the method described in the flowchart of FIG. 3 of the first improved solution, or according to the other solutions described. The locking function 770 may allow or deny access to and/or removal of the both the data stored on the media, and the media itself, in the hard drive slo, in the flash memory card slot, and/or in the optical drive slow. If a user fails to enter an appropriate password the docking station may prevent opening of the physical drives 720, 730 or 740 and thus prevent physical access to the media inside.

In an alternate embodiment, the improved solutions maybe used to lock a mass storage drive to prevent opening of the drive and access to media therein. An example is where a teacher or employer may want to prevent students (or employees, respectively) from removing a CD or other media from a mass storage drive. This would be desirable to prevent loss, theft or copying of the media in the mass storage drive.

Advantages of the improved solution include that it allows secure devices to be presented as non-removable media devices. This allows the OS to treat them as hard disks instead of floppies, so new file systems and disk formats are enabled. Another advantage is that this approach can make use of the existing class drivers available in all of the major OSes.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved solution and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A mass-storage device, comprising:
a bridge device including a Universal Serial Bus (USB) interface, the bridge device configured to implement a user access locking function accessible via the USB interface; and
a data mass-storage memory coupled by a data bus to the bridge device; the bridge device is configured to implement the user access locking function by:
enumerating the data mass-storage memory, when locked, as a USB device other than a USB mass storage class device; responding to a user access validation by unlocking and reenumerating the data mass-storage memory as a USB mass storage class device; and
in response to a failed validation of the user access, causing a host computer to display a mock device.

2. The device of claim 1, wherein the data mass-storage memory comprises one of a hard disk drive, a removable storage device, an optical disk storage device, or a non-volatile semiconductor memory device.

3. The device of claim 2, wherein the user access locking function is implemented in a circuit.

4. The device of claim 2, wherein the user access locking function is implemented in firmware.

5. A storage device, comprising:
a Universal Serial Bus (USB) bridge configured to implement a user access locking function; and
the USB bridge coupled by an interface to a mass-storage device; the USB bridge, the locking function, and the interface are implemented in a mass storage controller chip; and the USB bridge is configured to implement the user access locking function by:
- enumerating the data mass-storage memory, when locked, as a USB device other than a USB mass storage class device;
- responding to a user access validation by unlocking the mass-storage device and reenumerating the mass-storage device as a USB mass-storage class device; and
- in response to a failed validation of the user access, causing a host computer to display a mock device.

6. The storage device of claim 5, wherein the locking function is implemented in a circuit.

7. The storage device of claim 6, wherein the locking function is implemented in firmware.

* * * * *